INVENTOR.
LEONHARD M. LANTE
BY
-AGENT.

United States Patent Office 3,515,983
Patented June 2, 1970

3,515,983
PHOTOCONDUCTIVE CIRCUIT FOR MEASURING CAPACITY OF ELECTRICAL CELLS

Leonhard M. Lante, Costa Mesa, Calif., assignor to McDonnell Douglas Corporation, a corporation of Maryland
Filed May 27, 1968, Ser. No. 732,380
Int. Cl. G01n 27/46; G05f 1/40
U.S. Cl. 324—29.5          9 Claims

ABSTRACT OF THE DISCLOSURE

Constant current discharge circuit for determining actual electrical capacity of battery cells. Cell is connected to discharge through transistor means which is conductively controlled in accordance with the variable resistance of a photoresistor illuminated by a lamp that is energized by the dropping output voltage of the discharging cell. Decreasing brightness of lamp inversely varies the resistance of photoresistor so that conduction through the transistor means is increased to maintain a constant discharge current. Output voltage of discharging cell is continuously recorded timewise between predetermined voltage limits to provide ampere-hour capacity of tested cell. Circuit includes sensitivity and current adjustment means.

BACKGROUND OF THE INVENTION

My present invention pertains generally to the field of battery cell testing and more particularly to a constant current discharge circuit for determining the actual electrical capacity of a battery cell very accurately and with a minimum of monitoring and/or adjustments.

To determine the actual electrical capacity of a battery cell accurately, the commonly used method is to discharge the cell at a constant current into an adjustable resistive load and noting the time required for the output voltage of the cell to drop from its maximum voltage (cell fully charged) to a low, predetermined voltage where the cell is known to be fully discharged (or substantially so). For example, a battery cell is usually discharged at a constant current of 1.0 ampere through a change in cell discharge voltage from 1.8 to 1.0 volt, inclusively. Of course, other constant values of discharge current (rates) may be and are used to determine the actual electrical capacity of the cell. The capacity at any particular discharge rate is calculated in ampere-hours by multiplying the constant discharge current in amperes by the total discharge time in hours. The low, predetermined discharge endpoint voltage is usually selected to be 1.0 volt per cell because it is difficult to regulate the constant discharge current to lower voltages in the prior method. Thus, the true electrical capacity of the tested cell may be actually somewhat greater than measured.

In determining the capacity of a battery cell by the resistive load method, the resistive load must be continually readjusted to maintain a constant current discharge because the driving (discharge) voltage of the cell is continuously changing (dropping) due to the continual decrease in cell capacity on discharge. Readjustments of the resistive load must be made frequently and regularly by monitoring personnel. This is clearly time-consuming and prevents the monitoring personnel from performing much other work. In addition, these periodic readjustments do not maintain or produce a reasonably constant discharge current so that the actual electrical capacity of the cell under test cannot be accurately determined.

SUMMARY OF THE INVENTION

Briefly, and in general terms, my invention is preferably accomplished by providing a circuit including a battery cell to be tested wherein the output voltage of the cell is utilized to regulate its own discharge current continuously to a constant, selectively preset rate or value. This constant current discharge circuit includes a variable photoresistor and a lamp for varying the resistance of the photoresistor, a control transistor which is energized in accordance with the resistance of the photoresistor, and a power transistor controlled by the control transistor and having the battery cell connected to discharge through such power transistor. The battery cell is also connected through an adjustable resistor to energize the lamp which is then varied in brightness according to the instantaneous output voltage of the discharging cell, to vary the resistance of the photoresistor. The control transistor controls the conduction of the power transistor, and since the control transistor is energized in accordance with the resistance of the photoresistor, the conduction of the power transistor is dependent upon the resistance of the photoresistor. The adjustable resistor is used to set the discharge current from the battery cell to a selected rate or value. The photoresistor is, however, inversely variable in resistance with the brightness of the lamp. Thus, as the output voltage of the discharging cell drops, the conduction of the power transistor is correspondingly increased so as to maintain a constant discharge current therethrough. The circuit also includes means for adjusting the response sensitivity thereof, and more than one battery cell can be simultaneously tested in the circuit.

BRIEF DESCRIPTION OF THE DRAWING

My invention will be more fully understood, and other features and advantages thereof will become apparent, from the following description of certain exemplary embodiments of the invention. The description is to be taken in conjunction with the accompanying drawing, in which.

DESCRIPTION OF THE PRESENT EMBODIMENTS

Figure 1:
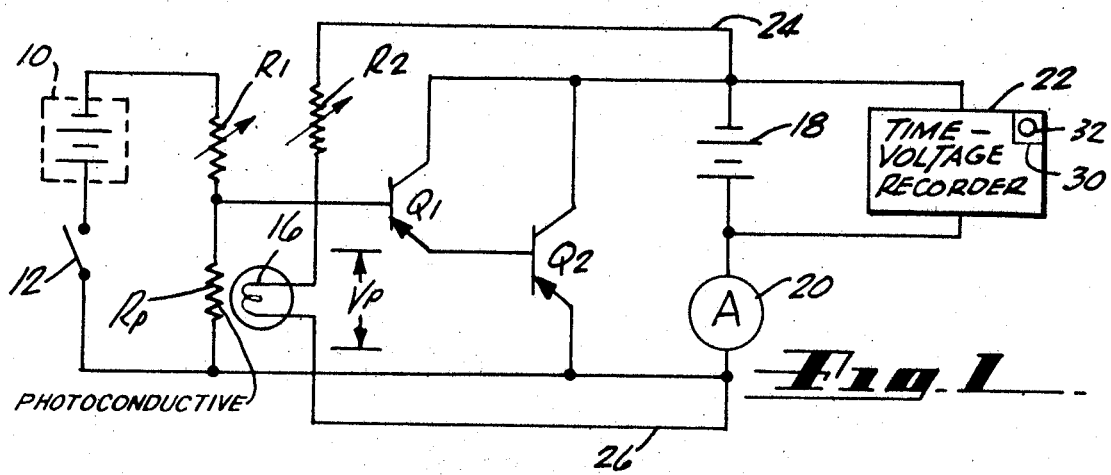
FIG. 1 is a circuit diagram of an illustrative embodiment of this invention.

FIG. 1 is a circuit diagram of an illustrative embodiment of my invention. A standard voltage source 10 which can be a 1.35 volt mercury cell, for example, has its positive terminal connected by switch 12 to one end of photoresistor R$p$. The other end of the photoresistor R$p$ is connected to the negative terminal of the source 10 through an adjustable resistor R1. A small lamp 16 is suitably positioned to illuminate the photoresistor R$p$. The photoresistor R$p$ is, of course, generally variable in resistance inversely to the brightness of the lamp 16. The brightness of the lamp 16 is, in turn, generally variable in accordance with the voltage V$p$ applied thereto. A satisfactory photoresistor and lamp set is one manufactured by General Electric, type Y1138, for example.

The common junction between the photoresistor R$p$ and resistor R1 is connected to the base of a control transistor Q1. The emitter of the transistor Q1 is connected to the base of a power transistor Q2, and the collectors of both transistors Q1 and Q2 are connected to the negative terminal of battery cell 18 which is to be tested. The emitter of the transistor Q2 is connected to the common junction between the switch 12 and photoresistor R$p$ and, also, to the positive terminal of the cell 18 through ammeter 20. A recorder 22 is connected across the cell 18 to record the voltage thereof. The recorder 22 is conventional and includes regular on-off controls to provide a suitable time versus voltage chart of the battery cell 18 when it is being discharged. The negative terminal of the cell 18 is additionally connected by lead 24 to one side of the lamp 16 through an adjustable resistor R2. Similarly, the positive terminal of the cell 18 is also connected to the other side of the lamp 16 through the ammeter 20 by lead 26. Thus, the changing voltage of the cell 18 is applied to the lamp 16 and varies the brightness thereof.

The transistor Q1 is a type 2N3638 transistor manufactured by Motorola, and the transistor Q2 is a type 2N178 transistor also manufactured by Motorola, for example. The resistor R1 can be adjustable in resistance from 0 to 200 ohms, and the resistor R2 can be adjustable in resistance from 0 to 2000 ohms in the illustrative embodiment of FIG. 1. It is to be understood, of course, that the various types and values of components noted herein are merely exemplary and given as illustrative examples only, and are not to be construed as limiting on this invention in any manner.

Figure 2:
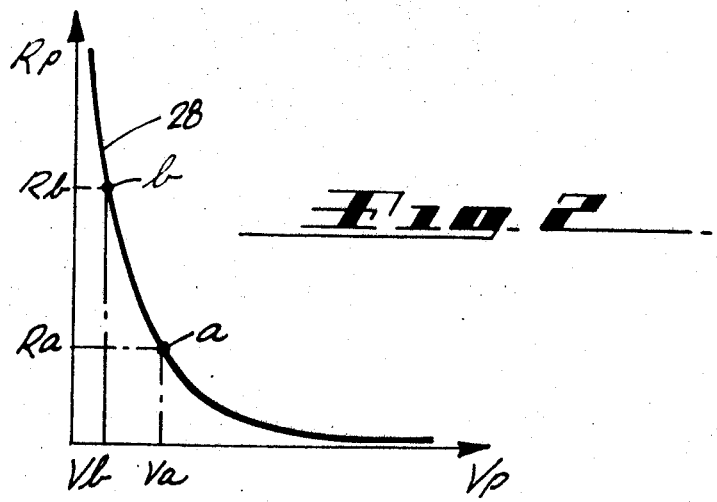
FIG. 2 is a graph showing a plot of the general response characteristic of a photoresistor and lamp set which can be used in the circuit of FIG. 1.

FIG. 2 is a graph showing a plot of the general variation of the resistance of the photoresistor Rp with the voltage Vp applied to the lamp 16. The photoresistor Rp and lamp 16 set shown in FIG. 1 is operated on a linear portion of its response characteristic. Thus, in FIG. 2, this can be the portion between points $a$ and $b$ indicated on curve 28. The voltage Vp across the lamp 16 for the point $a$ is Va, and this is produced by the selected initial output voltage of the battery cell 18 for the start point of its test. This voltage Va energizes the lamp 16 to a brightness which produces a corresponding resistance Ra for the photoresistor Rp. Similarly, the voltage Vp across the lamp 16 for the point $b$ is Vb, and this is produced by the selected final output voltage of the battery cell 18 for the finish point of its test. This voltage Vb produces a corresponding resistance Rb for the photoresistor Rp. The selected output voltage test range of the battery cell 18 is, for example, from 1.80 to 0.60 volt.

In operation, the battery cell 18 to be tested is connected in the circuit as shown in FIG. 1. The recorder 22 is turned on and the switch 12 is closed. The resistor R2 is next adjusted so that the cell 18 is discharging at a rate of 1.00 ampere as indicated by ammeter 20. The resistor R1 is then adjusted to a resistance where the indicated current just starts to drop off. This circuit condition is highly sensitive and will immediately respond to any changes in the output voltage of the discharging battery cell 18.

At the beginning of the test, the output voltage of the cell 18 is high at, for example, 1.80 volt. The voltage Vp across the lamp 16 is correspondingly high at the voltage Va for the point $a$ indicated in FIG. 2. The lamp 16 is bright and the photoresistor Rp has the corresponding lower resistance Ra. As the output voltage of the discharging cell 18 decreases, the lamp 16 also decreases in brightness such that the photoresistor Rp increases in resistance. This increases the negative bias or signal on the base of the control transistor Q1 which, in turn, drives the power transistor Q2 harder and increases the current therethrough. The net result is that the discharge current of the cell 18 is maintained constant throughout the entire test. The regulation of this circuit is, for example, ±20 milliamperes.

At the finish or endpoint of the test, the output voltage of the cell 18 is low at, for example, 0.60 volt. The voltage Vp across the lamp 16 is correspondingly low at the voltage Vb for the point $b$ indicated in FIG. 2. The lamp 16 has decreased substantially in intensity and the photoresistor Rp has the corresponding higher resistance Rb. The number of hours required for the output voltage of the battery cell 18 to drop from 1.80 to 0.60 volt is obtained directly from the recorded chart in the recorder 22. This will, of course, immediately give the ampere-hour capacity of the battery cell 18 for the noted voltage limits since the discharge current of the cell 18 was maintained accurately at 1.00 ampere throughout the test interval.

It should also be apparent that, once the resistors R1 and R2 in FIG. 1 have been properly adjusted at the start of a test, no further adjustments and very little monitoring are thereafter required. Even the little monitoring that might be required could be eliminated by the inclusion of suitable control or warning means 30 in the recorder 22. Such means 30 can be set to be operatively responsive when the recorder 22 (needle) reaches a predetermined level of, for example, 0.55 volt which is a little below the selected endpoint (0.60 volt) of the test. The means 30 can be a relay, for example, which is energized at this predetermined level to apply power to indicator lamp 32 and, if desired, another relay (not shown) that would open the switch 12 at the same time. It is noted that due to the relatively high resistance of the photoresistor Rp throughout the test interval, the current drain of the standard source 10 (mercury cell) is limited to a small amount (approximately 0.1 ma. average) which insures a long life for the (mercury cell) standard source 10.

Figure 3:
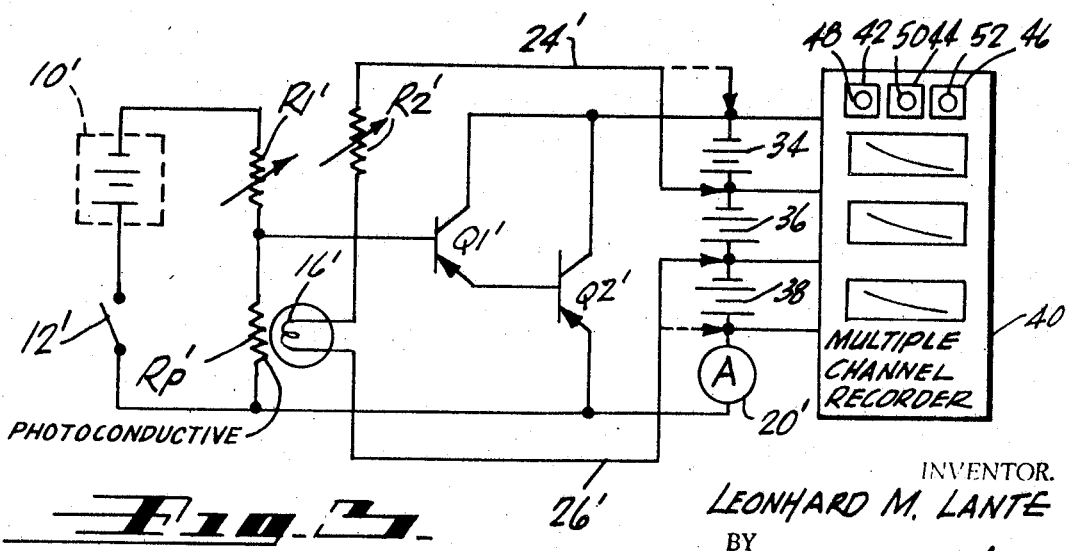
FIG. 3 is a circuit diagram which is similar to that of FIG. 1 except that a plurality of battery cells can be tested in the circuit shown in FIG. 3.

FIG. 3 shows a plurality of battery cells connected in a circuit similar to that of FIG. 1 for test. Three cells 34, 36 and 38 are illustratively shown although more or less could be connected in the same manner (in series). The cells 34, 36 and 38 are connected to respective channels of a multiple channel recorder 40 to record the voltage variations of each of the cells 34, 36 and 38. The recorder 40 includes control or warning means 42, 44 and 46 which are associated with respective channels of the recorder 40. These means 42, 44 and 46 perform the same function as the means 30 in the recorder 22 shown in FIG. 1, and similarly control respective indicator lamps 48, 50 and 52. Since the circuit of FIG. 3 is essentially the same as that of FIG. 1, similar identification characters are utilized with prime marks added for the remaining components of the circuit.

The operation of the circuit shown in FIG. 3 is similar to that of FIG. 1. The discharge current of the battery cells 34, 36 and 38 would, of course, be adjusted to 1.00 ampere as before since the cells 34, 36 and 38 are connected in series. However, components of proper or suitable values and ratings would be required according to the number and voltages of the battery cells that are connected in series in the circuit. The leads 24' and 26' are arbitrarily connected across the battery cell 36 although they could be connected across either of the other two cells 34 and 36.

An alternative connection for the leads 24' and 26' could be that across all three series cells 34, 36 and 38 as indicated by the broken line positions of the leads 24' and 26'. The difference between a connection across the one arbitrary cell 36 or all three cells 36, 38 and 40 is that the discharge current would be regulated by one arbitrary cell in the former case whereas such current would be regulated by the sum (overall average) of all of the involved cells in the latter case. A compromise could involve a connection of the leads 24' and 26' across two series cells of the three. Of course, suitable values and ratings of the adjustable resistor R2' and lamp 16' as may be required by the particular case are used. In the testing of plural cells, if a cell is bad, this usually shows up early on the voltage recorder 40 and the defective cell can be promptly removed and/or replaced.

What is claimed is:
1. Constant current discharge circuit comprising:
   battery cell means having an output voltage which changes from a first selected level to a second selected level on discharge thereof;
   resistance means which is responsively variable in resistance with the change in output voltage of said cell means on discharge thereof;
   transistor means connected to said cell means for discharging the same, said transistor means being variably conductive according to the resistance of said resistance means whereby as the output voltage of said cell means changes, the resistance of said re- sistance means is responsively varied to change the conductivity of said transistor means and maintain a constant current discharge from said cell means therethrough;

means for measuring the magnitude of the constant current discharge from said cell means; and means for measuring the time required for the output voltage of said cell means to change from said first selected level to said second selected level whereby the actual electrical capacity of said cell means can be accurately determined.

2. The invention as defined in claim 1 wherein said means for measuring the magnitude of the constant current discharge from said cell means includes an ammeter connected in series in a loop comprising said cell means and said transistor means, and said means for measuring the time required for the output voltage of said cell means to change from said first selected level to said second selected level includes a time-voltage recorder connected across said cell means to record the output voltage thereof.

3. The invention as defined in claim 1 wherein said cell means includes a plurality of battery cells connected in series, said means for measuring the magnitude of the constant current discharge from said cell means includes an ammeter connected in series in a loop comprising said cell means and said transistor means, and said means for measuring the time required for the output voltage of said cell means to change from said first selected level to said second selected level includes a multiple channel time-voltage recorder having its channels connected across respective ones of said battery cells to record the corresponding output voltages thereof.

4. Constant current discharge circuit comprising:

battery cell means having an output voltage which changes from a first selected level to a second selected level on discharge thereof;

resistance means which is responsively variable in resistance with the change in output voltage of said cell means on discharge thereof, said responsively variable resistance means including a lamp energized by and varied in brightness according to the output voltage of said cell means, and a photoresistor illuminated by said lamp and connected to a standard source of voltage; and transistor means connected to said cell means for discharging the same, said transistor means being variably conductive according to the resistance of said resistance means whereby as the output voltage of said cell means changes, the resistance of said resistance means is responsively varied to change the conductivity of said transistor means and maintain a constant current discharge from said cell means therethrough, the resistance of said photoresistor varying inversely with the brightness of said lamp and providing a correspondingly varied voltage from said photoresistor for control of the conductivity of said transistor means whereby a constant current discharge from said cell means is maintained through said transistor means.

5. The invention as defined in claim 4 including a current control resistor connecting said cell means to said lamp, said current control resistor being adjustable in resistance to vary the proportion of voltage drops respectively across said current control resistor and lamp whereby the magnitude of the constant current discharge from said cell means can be adjusted.

6. The invention as defined in claim 4 including a sensitivity control resistor connecting said standard voltage source to said photoresistor, said sensitivity control resistor being adjustable in resistance to vary the proportion of voltage drops respectively across said sensitivity control resistor and photoresistor whereby the response sensitivity of said circuit to changes in the output voltage of said cell means can be adjusted.

7. The invention as defined in claim 4 including means for measuring the magnitude of the constant current discharge from said cell means, and means for measuring the time required for the output voltage of said cell means to change from said first selected level to said second selected level whereby the actual electrical capacity of said cell means can be accurately determined.

8. The invention as defined in claim 7 wherein said means for measuring the magnitude of the constant current discharge from said cell means includes an ammeter connected in series in a loop comprising said cell means, and said transistor means, and said means for measuring the time required for the output voltage of said cell means to change from said first selected level to said second selected level includes a time-voltage recorder connected across said cell means to record the output voltage thereof.

9. The invention as defined in claim 8 including a current control resistor connecting said cell means to said lamp, said current control resistor being adjustable in resistance to vary the proportion of voltage drops respectively across said current control resistor and lamp whereby the magnitude of the constant current discharge from said cell means can be adjusted, a sensitivity control resistor connecting said standard voltage source to said photoresistor, said sensitivity control resistor being adjustable in resistance to vary the proportion of voltage drops respectively across said sensitivity control resistor and photoresistor whereby the response sensitivity of said circuit to changes in the output voltage of said cell means can be adjusted, and wherein said transistor means includes a power transistor connected to said cell means for discharging the same, and a control transistor responsive to the varied voltage from said photoresistor and connected to said power transistor for controlling the conductivity thereof.

References Cited

UNITED STATES PATENTS 3,432,743   3/1969   Ford _____ 324—29.5 X

OTHER REFERENCES

German Allowed Application No. 1,126,502; Mar. 29, 1962; 1 sheet drawings, 2 pages spec. Copy in Group 258 (324–29.5).

GERARD R. STRECKER, Primary Examiner

U.S. Cl. X.R.

323—4, 21